United States Patent
Li et al.

(10) Patent No.: US 9,680,625 B2
(45) Date of Patent: Jun. 13, 2017

(54) METHOD AND NODE FOR LISTENING

(71) Applicant: Huawei Technologies Co., Ltd., Shenzhen (CN)

(72) Inventors: Yang Li, Shenzhen (CN); Qiang Li, Shenzhen (CN); Lei Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 14/542,101

(22) Filed: Nov. 14, 2014

(65) Prior Publication Data
US 2015/0071133 A1    Mar. 12, 2015

Related U.S. Application Data

(63) Continuation of application No. PCT/CN2013/075702, filed on May 16, 2013.

(30) Foreign Application Priority Data

May 16, 2012    (CN) .......................... 2012 1 0150836

(51) Int. Cl.
| | |
|---|---|
| *H04J 3/14* | (2006.01) |
| *H04L 5/00* | (2006.01) |
| *H04W 72/12* | (2009.01) |
| *H04L 5/14* | (2006.01) |
| *H04W 72/04* | (2009.01) |
| *H04W 52/38* | (2009.01) |
| *H04W 52/24* | (2009.01) |
| *H04W 72/00* | (2009.01) |

(52) U.S. Cl.
CPC .......... *H04L 5/0062* (2013.01); *H04L 5/0005* (2013.01); *H04L 5/0048* (2013.01);
(Continued)

(58) Field of Classification Search
CPC ......... H04L 5/14; H04L 5/0062; H04L 27/02; H04L 5/0005
(Continued)

(56) References Cited

U.S. PATENT DOCUMENTS

| | | | |
|---|---|---|---|
| 8,509,701 B2* | 8/2013 | Selen .................... | H04W 24/08 455/509 |
| 9,320,047 B2* | 4/2016 | Li ....................... | H04W 72/085 |

(Continued)

FOREIGN PATENT DOCUMENTS

| | | |
|---|---|---|
| CN | 101895895 A | 11/2010 |
| CN | 103428712 A | 12/2013 |

(Continued)

*Primary Examiner* — Ricky Ngo
*Assistant Examiner* — Dewanda Samuel
(74) *Attorney, Agent, or Firm* — Leydig, Voit & Mayer, Ltd.

(57) ABSTRACT

Embodiments of the present invention disclose a method and a node for listening. The method includes: receiving a listening reference signal in a listening pilot time slot; analyzing the listening reference signal received to obtain interference information of a node sending the listening reference signal and/or a resource configuration of a node sending the listening reference signal. By adopting the present invention, the node in the embodiments of the present invention receives the listening reference signal in the listening pilot time slot, and analyzes the received listening reference signal to obtain the interference information of a node sending the listening reference signal and/or the resource configuration of the node sending the listening reference signal, so as to listen to an interference condition and/or a resource configuration of an adjacent node.

16 Claims, 7 Drawing Sheets

(52) U.S. Cl.
CPC .............. *H04L 5/0053* (2013.01); *H04L 5/14* (2013.01); *H04W 52/383* (2013.01); *H04W 72/0446* (2013.01); *H04W 72/1278* (2013.01); *H04W 52/243* (2013.01); *H04W 72/00* (2013.01); *H04W 72/04* (2013.01)

(58) Field of Classification Search
USPC ................................ 370/436, 458, 500, 504
See application file for complete search history.

(56) References Cited

U.S. PATENT DOCUMENTS

| | | | | |
|---|---|---|---|---|
| 2008/0165880 | A1* | 7/2008 | Hyon | H04B 7/026 375/267 |
| 2010/0265910 | A1* | 10/2010 | Suo | H04L 5/0048 370/330 |
| 2011/0275382 | A1 | 11/2011 | Hakola et al. | |
| 2012/0021689 | A1* | 1/2012 | Han | H04W 76/023 455/63.1 |

FOREIGN PATENT DOCUMENTS

| | | |
|---|---|---|
| WO | WO 2009083927 A1 | 7/2009 |
| WO | WO 2011069295 A1 | 6/2011 |
| WO | WO 2011088619 A1 | 7/2011 |

\* cited by examiner

METHOD AND NODE FOR LISTENING

CROSS-REFERENCE TO RELATED APPLICATIONS

This application is a continuation of International Patent Application No. PCT/CN2013/075702, filed on May 16, 2013, which claims priority to Chinese Patent Application No. 201210150836.0 filed on May 16, 2012, both of which are hereby incorporated by reference in their entireties.

TECHNICAL FIELD

The present invention relates to the field of mobile communications, and more particularly to a method and node for listening.

BACKGROUND

With the development of mobile communication technologies, high-speed and large-bandwidth services are bringing colorful application experiences to users, and the pursuit of the users to free, high-speed and high-quality communications will also be never-ending. It is predicted that in the next five years demand for mobile data service traffic will increase by 40 times, with an average annual increase of 8-10 times. Traditional cellular mobile communication takes large coverage and high mobility as main design targets, and in outdoor environments, wireless link performance has been close to the Shannon limit, and it has been overwhelmed by wireless data services with rapid growth.

Statistical data show that, more than 80% of data services occur indoors, and service of high-speed data service may be provided by deploying a small indoor base station and utilizing a low mobile speed specific to an unique indoor environment, a short distance between the base station and a user terminal and an indoor rich scattering channel. However, when a plurality of small base stations are deployed in a dedicated area, if adjacent small base stations adopt different uplink and downlink sub frame ratios, it will lead to inter-basestation interference and inter-UE (User Terminal) interference. Therefore, in order to reduce the influence brought by the inter-basestation interference and the inter-UE (User Terminal) interference, some listening mechanisms need to be adopted to obtain interference condition of adjacent base stations or UEs, so as to perform necessary interference coordination.

In addition, in order to reduce load pressure of a cellular network, a D2D (Device to Device, device to device) communication mode is an effective way as well. In the D2D mode, close UEs may directly perform data transmission without forwarding through a base station. Before establishment of a D2D connection, a UE needs to listen to signals sent by other UEs to detect an opposite UE meeting a D2D communication channel condition, or to detect a D2D communication link inflicting severe interference to it. Therefore, the D2D communication mode also requires a certain listening mechanism to achieve UE discovery and interference coordination.

However, in practical application, the inventor found that a good method for listening interference between base stations, between UEs or between a base station and a UE has been unavailable in the prior art.

SUMMARY

A technical problem to be solved in embodiments of the present invention is to provide a method and a node for listening, which can perform listening on the interference condition or resource configuration of adjacent nodes.

In order to solve the above-mentioned technical problem, the embodiments of the present invention provide a method for listening, including:

receiving a listening reference signal in a listening pilot time slot;

analyzing the listening reference signal received to obtain interference information of a node sending the listening reference signal and/or a resource configuration of a node sending the listening reference signal.

Correspondingly, the embodiments of the present invention further provide a method for listening, including:

sending a listening reference signal in a listening pilot time slot, wherein the listening reference signal is used for transmitting interference information to a node receiving the listening reference signal and/or a resource configuration.

Correspondingly, the embodiments of the present invention further provide a node, including:

a receiving module, configured to receive a listening reference signal in a listening pilot time slot;

a processing module, configured to analyze the listening reference signal received to obtain interference information of a node sending the listening reference signal and/or a resource configuration for sending the listening reference signal.

Correspondingly, the embodiments of the present invention further provide a node, including:

a sending module, configured to send a listening reference signal in a listening pilot time slot, wherein the listening reference signal is used for transmitting interference information to a node receiving the listening reference signal and/or a resource configuration.

The embodiments of the present invention have the following beneficial effects:

the node in the embodiments of the present invention receives the listening reference signal in the listening pilot time slot, and analyzes the received listening reference signal to obtain the interference information of a node sending the listening reference signal and/or the resource configuration of the node sending the listening reference signal, so as to listen to an interference condition and/or a resource configuration of an adjacent node.

BRIEF DESCRIPTION OF DRAWINGS

In order to illustrate the technical solutions in the embodiments of the present invention more clearly, accompanying drawings needed for describing the embodiments are introduced briefly in the following. Obviously, the accompanying drawings in the following description are some embodiments of the present invention, and persons of ordinary skill in the art may further obtain other accompanying drawings according to these accompanying drawings without making creative efforts.

DESCRIPTION OF EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any inventive efforts, fall into the protection scope of the present invention.

Figure 1:
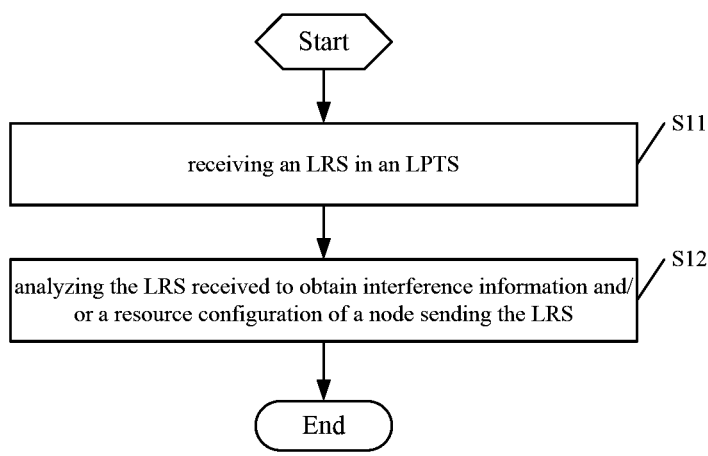
FIG. 1 is a schematic flowchart of a first embodiment of a listening method of the present invention.

Referring to FIG. 1, it is a schematic flowchart of a first embodiment of a listening method of the present invention.

The subject of the method in FIG. 1 may be a node, and the node may be an eNB (evolved Node B, evolved Node B) or a UE. Since the node may be the eNB or the UE, mutually listening between eNBs, between UEs or between an eNB and a UE may be achieved. The method in FIG. 1 includes:

step S11, receiving an LRS (Listening Reference Signal, listening reference signal) in an LPTS (Listening Pilot Time Slot, listening pilot time slot);

step S12, analyzing the LRS received to obtain interference information and/or a resource configuration of a node sending the LRS.

The LPTS in step S11 is illustrated firstly.

Figure 2:
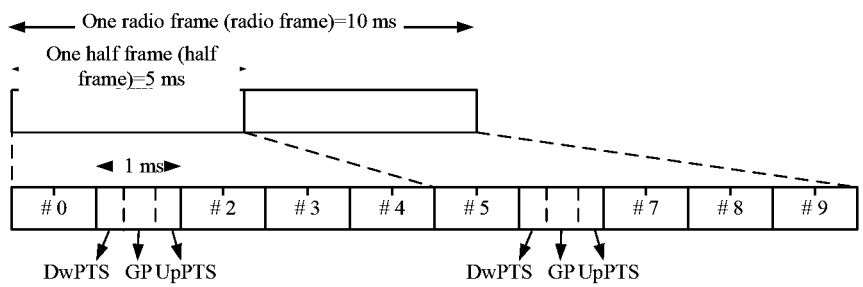
FIG. 2 is a schematic diagram of a structure of a radio frame in an existing LTE TDD system.

Referring to FIG. 2, it is a schematic diagram of a structure of a radio frame in an existing LTE TDD (Long Term Evolution Time Division Duplexing, long term evolution time division duplexing) system. As shown in FIG. 2, duration of one radio frame (One radio frame) is 10 ms, the radio frame includes two half frames with duration of 5 ms (One half frame), one half frame includes 5 sub frames, and duration of each sub frame is 1 ms. Taking the first half frame as an example, it includes a sub frame 0 (#0), a sub frame 1 (#1), a sub frame 2 (#2), a sub frame 3 (#3) and a sub frame 4 (#4); in the first half frame, the sub frame 1 is called a "special sub frame" by those skilled in the art, for the sub frame 1 includes: a DwPTS (Downlink Pilot Time Slot, downlink pilot time slot), a GP (Guard Period, guard period) and a UpPTS (Uplink Pilot Time Slot, uplink pilot time slot). It should be noted that, under a condition of some uplink and downlink sub frame ratios (ratios 0, 1, 2, 6), the "special sub frame", namely, a sub frame 6, also exists in the second half frame, and which also includes: the DwPTS, the GP and the UpPTS. A guard period (GP) may be used for implementing uplink and downlink switch, for avoiding uplink and downlink interference resulting from propagation time delay between adjacent cells.

In the embodiment, the LPTS is located in the GP in FIG. 2, and the LPTS is provided with guard periods with the DwPTS and the UpPTS. It should be noted that the LPTS may be located in the GP of a first and/or a second "special sub frame" in FIG. 2.

Figure 3:
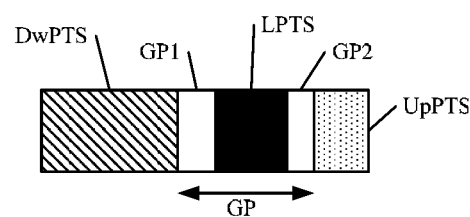
FIG. 3 is a schematic diagram of a structure of an embodiment of a special sub frame in an LTE TDD system of the present invention.

Referring to FIG. 3, it is a schematic diagram of a structure of an embodiment of a special sub frame in the LTE TDD system of the present invention. As shown in FIG. 3, the LPTS is located in the GP and may occupy one or multiple symbols (in a frame structure, a symbol is a minimal time unit). The LPTS is provided with guard periods GP1 and GP2 with the DwPTS and the UpPTS respectively. It should be noted that, the lengths of the GP, the LPTS, the GP1 and the GP2 may be pre-configured to make them meet a listening requirement. In the LTE TDD system, it will not generate any effects on a node not supporting the listening method of the embodiment that the LPTS is arranged in the GP of the special sub frame, which improves backward compatibility of the listening method of the embodiment.

Figure 4:
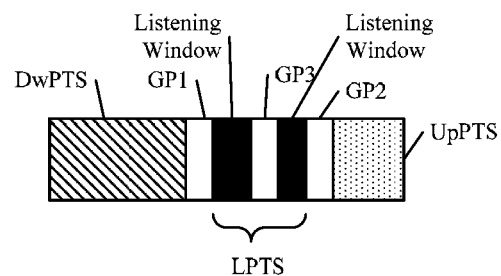
FIG. 4 is a schematic diagram of a structure of an embodiment of a special sub frame including two listening windows.

Further, the LPTS may also be divided into at least two listening windows, guard periods are arranged between the listening windows, a function of each listening window equals to a listening time slot, and the node may send or receive a listening reference signal in each listening window. For example, as shown in FIG. 4, it is a schematic diagram of a structure of an embodiment of a special sub frame including two listening windows.

Figure 5:
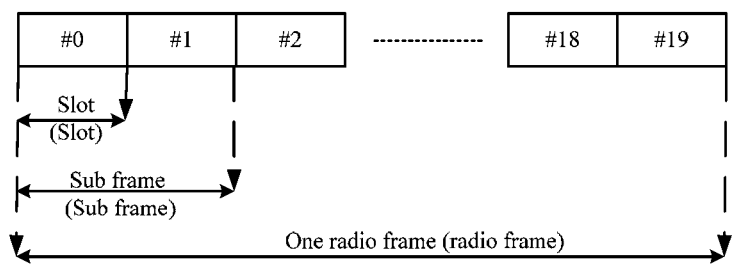
FIG. 5 is a schematic diagram of a frame structure of an uplink frequency band or a downlink frequency band in an existing LTE FDD system.

Referring to FIG. 5, it is a schematic diagram of a structure of an uplink frequency band or a downlink frequency band in an existing LTE FDD (Long Term Evolution Frequency Division Duplexing, long term evolution frequency division duplexing) system. In the LTE TDD system, uplink and downlink data are transmitted in different frequency bands, the LTE FDD system adopts paired frequency bands to transmit data, and the adopted frequency bands are called uplink frequency bands or downlink frequency bands. As shown in FIG. 5, the length of the uplink frequency band or the downlink frequency band is 10 ms, it includes 10 sub frames (Sub frame) with length of 1 ms, each sub frame includes two time slots, and the length of each time slot is 0.5 ms. For example, in FIG. 5, a time slot 0 (#0) and a time slot (#1) form the $0^{th}$ sub frame. In FIG. 5, each sub frame may be used for transmitting a data signal or a control signal.

Figure 6:
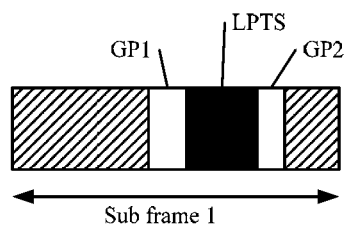
FIG. 6 is a schematic diagram of a structure of an embodiment of a dedicated sub frame in an LTE FDD system of the present invention.

In the embodiment, the LPTS is located in a dedicated sub frame of the uplink frequency band or in a dedicated sub frame of the downlink frequency band, and a guard period is arranged between the LPTS and a time slot occupied by a data signal of the dedicated sub frame, or a guard period is arranged between the LPTS and a time slot occupied by a control signal of the dedicated sub frame. In this case, the dedicated sub frame may be any sub frame in FIG. 5, and preferably, the dedicated sub frame is the first sub frame in FIG. 5, namely, a sub frame composed of a time slot 2 (#2) and a time slot 3 (#3). An advantage of taking the first sub frame as the dedicated sub frame for setting LPTS lies in that: positions of the LPTS in the LTE TDD system and the LTE FDD system may be identical, and thus design complexity of a system is reduced. Specifically, please refer to FIG. 6, it is a schematic diagram of a structure of an embodiment of a dedicated sub frame in an LTE FDD system of the present invention. It may be understood that, in the LTE FDD system, the LPTS may further include a plurality of listening windows, a meaning and a function of the listening windows are similar to those in the LTE TDD system, and will not be repeated redundantly herein.

Figure 7:
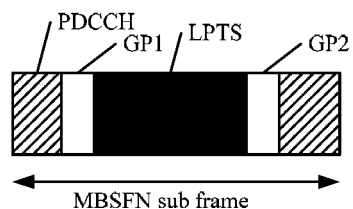
FIG. 7 is a schematic diagram of a structure of an embodiment of an MBFSN sub frame of the present invention.

In the embodiment, in an LTE system, the LPTS may also be located in an MBFSN sub frame configured as an MBFSN (Broadcast Multicast) sub frame, and a guard period is arranged between the LPTS and a time slot occupied by a data signal of the MBSFN sub frame or a guard period is arranged between the LPTS and a time slot occupied by a control signal of the MBFSN sub frame. The MBFSN sub frame includes a PDCCH (physical downlink control channel, physical downlink control channel) for a unicast and a broadcast multicast data channel Since when there is no a broadcast multicast service, a UE in a cell will not receive downlink data on the sub frame; therefore, a part of resources of the data channel may be used for sending and receiving LRS between the base stations or between the UEs. Specifically, as shown in FIG. 7, the LPTS is located behind the PDCCH of the MBFSN sub frame and is provided with guard periods GP1 and GP2 with the PDCCH or other channels or signals not for listening, respectively. Similarly, the LPTS may further include at least two listening windows, different nodes send or receive listening reference signals on different listening windows, and the guard periods are arranged between multiple listening windows.

In the embodiment, under a multicarrier communication condition, the LPTS may also be located in one or more pre-set carriers in all available carriers of the system. In the pre-set carriers containing the LPTS, the LPTS may be located in the foregoing special sub frame, the dedicated sub frame or the MBFSN sub frame. Further, if the pre-set carriers are merely used for transmitting the listening reference signal, a time-frequency resource on the pre-set carriers may be divided into one or more LPTSs, and the guard periods are arranged between different LPTSs.

The LPTS in step S11 is illustrated above, and a further illustration to step S11 is made below.

In addition, step S11 may include: receiving the LRS in the LPTS according to an indication of a configured listening pattern.

The listening pattern includes: a receiving listening pattern. The listening patterns used by the node may be uniformly configured by the system in advance, that is to say, the system may allocate the listening patterns to each node in advance. Or, the configured listening pattern used by the node may also be obtained actively by the node according to its own node sequency number, wherein a relationship of a node sequency number and a listening pattern is pre-configured; for example, the corresponding relationship of a node sequence number 0 and a listening pattern 0 is configured in advance, and then the node with node sequence number of 0 will automatically obtain the listening pattern 0 to be used.

In the above-mentioned description, the receiving listening pattern defines some resource information when the node receives a listening signal, for example, when the receiving listening pattern needs to receive the LRS and receives what kind of the LRS, etc. It should be noted that, the node may directly receive the LRSs of other nodes in these LPTSs not needing to send the LRS, instead of according to the indication of the receiving listening pattern, and when receiving the LRSs, the node does not need to perform signal search, in order to reduce consumption of listening time and power. In the embodiment, the receiving listening pattern is allocated to the node, so that the node listens to some dedicated LRS signals at a dedicated time. In some implementations, the receiving listening pattern includes an LRS sequence and time-frequency position information of the LRS, wherein the LRS sequence corresponds to the LRS which the node needs to receive, and the time-frequency position information of the LRS corresponds to time and frequency information of the LRS which the node needs to receive. Therefore, the receiving the LRS in the LPTS according to an indication of a configured receiving listening pattern, further includes: receiving the LRS corresponding to the LRS sequence in the LPTS corresponding to the time-frequency information of the LRS.

An illustration to the above-mentioned process is described below merely schematically.

It is assumed that in the LTE TDD system, the LPTS is located in the sub frame 1 of each radio frame, and there are four mutually orthorhombic LRS sequences {sequence_0, sequence_1, sequence_2, sequence_3}, for defining four listening patterns as shown in Table 1.

TABLE 1

| Listening pattern sequence number | LRS sequence | Time-frequency position information |
|---|---|---|
| 0 | Sequence_0 | arg[Mod ($N_{frame}$, 4)]∈{0, 1, 2} |
| 1 | Sequence_1 | arg[Mod ($N_{frame}$, 4)]∈{1, 2, 3} |
| 2 | Sequence_2 | arg[Mod ($N_{frame}$, 4)]∈{0, 2, 3} |
| 3 | Sequence_3 | arg[Mod ($N_{frame}$, 4)]∈{0, 1, 3} |

In table 1, $N_{frame}$ expresses a sequence number of a radio frame, and arg[Mod ($N_{frame}$, x)]=y expresses a radio frame meeting the condition that the sequence number modulo x is equal to y. In this way, for a radio frame 0, a radio frame 1, a radio frame 2 and a radio frame 3, $N_{frame}$ in the time-frequency position information arg[Mod (Nframe, 4)]∈{0,1, 2} of the listening pattern 0 is equal to 0,1,2, and that of the other listening patterns are similar. That is to say, the node which is allocated the listening pattern 0 will send an LRS corresponding to the sequence_0 in the LPTSs of the radio frame 0, the radio frame 1 and the radio frame 2.

The above-mentioned listening patterns 0-3 are allocated to eNB1, eNB2, UE1 and UE2 respectively, and then the node will send the LRS on the allocated listening pattern and receive the LRS sent by other nodes on other listening patterns. After passing the radio frame 0, the radio frame 1, the radio frame 2 and the radio frame 3, the statistics on sending or receiving LRS between the nodes is shown in Table 2.

TABLE 2

|  | Radio frame 0 | Radio frame 1 | Radio frame 2 | Radio frame 3 |
|---|---|---|---|---|
| eNB1 | Sending LRS | Sending LRS | Sending LRS | Receiving LRS |
| eNB2 | Receiving LRS | Sending LRS | Sending LRS | Sending LRS |
| UE1 | Sending LRS | Receiving LRS | Sending LRS | Sending LRS |
| UE2 | Sending LRS | Sending LRS | Receiving LRS | Sending LRS |

It can be seen from Table 2, within the duration of the four radio frames, mutually listening between every two of the eNB1, the eNB2, the UE1 and the UE2 is achieved.

Step S11 in FIG. 1 is illustrated above, and step S12 in FIG. 1 is further illustrated below.

The execution condition of step S12 in FIG. 1 is that step S11 in FIG. 1 is: the node receives the LRS in the LPTS.

In step S12, the received LRS is mainly analyzed in three manners: one is to detect the received signal power of the LRS to obtain the interference information of the node sending the LRS to this node (refer to the subject of the method embodiment), the interference information may be signal interference strength information, and the interference information may include: the interference of the node sending the listening reference signal to the node (namely, this node) receiving the reference signal, or the interference to the node sending the listening reference signal by the node receiving a reference signal; another one is to detect a sequence and/or a time-frequency position of the received LRS and obtain the interference information of the node sending the LRS according to a mapping relationship between the interference information and the sequence and/or the time-frequency position; still another one is to detect a sequence and/or a time-frequency position of the received LRS and obtain the resource configuration of the node sending the LRS according to a mapping relationship between the resource configuration and the sequence and/or time-frequency position, wherein the resource configuration includes at least one of an uplink and downlink sub frame ratio, an uplink and downlink carrier wave ratio, an uplink and downlink frequency band resource position, an uplink and downlink frequency band bandwidth and an available service resource type; the service resource type may be a large data file service, a short message service, a voice service, a time-frequency service or the like, and is mainly applied to an D2D communication between user equipments.

In addition, in the detection of the sequence and/or the time-frequency position of the received LRS, timing and a frequency of the node sending the LRS may further be directly determined, so as to achieve time or frequency synchronization with the node sending the LRS, and the synchronization herein may specifically indicate initial synchronous obtaining or synchronous tracking. The timing may include symbol timing and frame timing, and the timing may also be considered as a kind of resource configuration.

By the above-mentioned three analysis manners, this node may understand the interference information of the node sending the LRS to this node or the interference information of the node sending the LRS by this node or the resource configuration used by the node sending the LRS. Further, this node may coordinate interference of this node and the node sending the LRS based on the above-mentioned information, in order to reduce the interference between the nodes. It should be noted that the embodiment may be applied to an D2D communication. For example, if UE1 and UE2 has established an D2D connection, the UE1 may know the condition of a connection with the UE2 through the embodiment, and may select to actively release the connection with the UE2 in the case of severe interference; if the UE1 and the UE2 do not establish the D2D connection, the UE1 may listen to resource configurations of other UEs by using the method of the embodiment, so as to find the UE2 and establish the connection with the UE2. Of course, the method of the embodiment may not only be applied to the D2D communication, but also be applied to other occasions needing the interference information and/or the resource configuration listened by step S12, and this is not limited in the embedment.

The node in the embodiment of the present invention receives the listening reference signal in the listening pilot time slot, and analyzes the received listening reference signal to obtain the interference information and/or the resource configuration of the node sending the listening reference signal, so as to listen to an interference condition and/or a resource configuration of an adjacent node.

Figure 8:
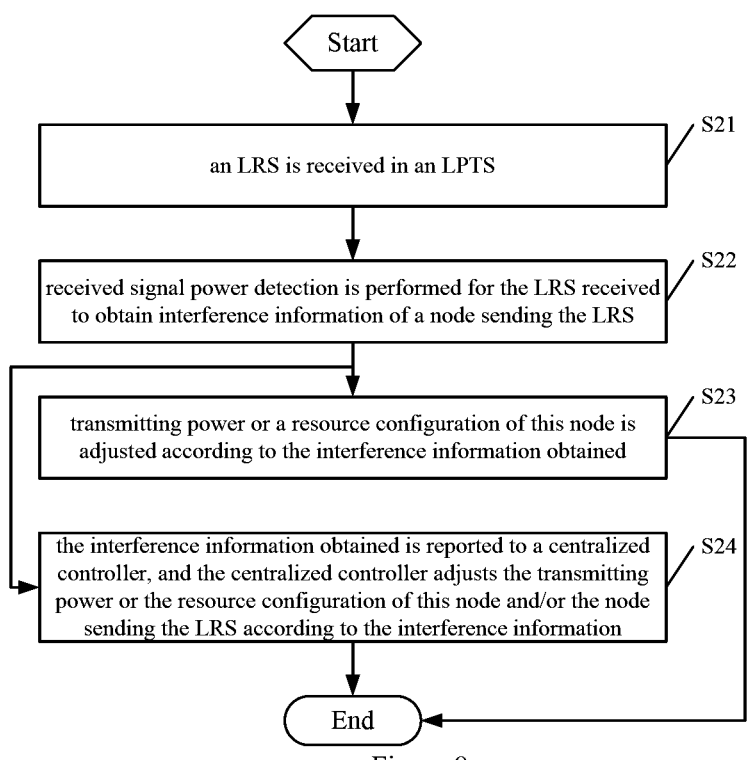
FIG. 8 is a schematic flowchart of a second embodiment of a listening method of the present invention.

Referring to FIG. 8, it is a schematic flowchart of a second embodiment of the listening method of the present invention. The flow of the method in FIG. 8 includes:

Step S21, an LRS is received in an LPTS.

The step is the same as the condition of receiving the LRS in step S11 in FIG. 1, and will not be repeated redundantly herein.

Step S22, received signal power detection is performed for the LRS received in step S21 to obtain interference information of a node sending the LRS.

Specifically, it may be set in advance that transmitting power of the LRS is in direct proportion to transmitting power of a service channel of the node, the transmitting power of the service channel may express the interference information. Generally, the higher the transmitting power of the service channel is, the more severe the interference is, and thus, it may be understood herein that a mapping relationship (direct proportion relationship) between the transmitting power of the LRS and the interference information is preset. In step S22, when the received signal power of the received LRS is detected to obtain the transmitting power of the listening reference signal, current transmitting power of the service channel of the node sending the LRS may be obtained according to the above-mentioned direct proportion relationship, so as to obtain the interference information of the node sending the LRS to this node, and the interference information herein mainly indicates signal interference strength information. For example, in step S22, if the received signal power of the received LRS is detected and it is found that the power of the received LRS is high, it will be indicated that the current transmitting power of the service channel of the node sending the LRS is high, that is to say, the signal interference strength of the node sending the LRS to the this node is strong currently; on the contrary, the signal interference strength of the node sending the LRS to this node is weak currently.

Optionally, step S22 may also be: detecting a sequence and/or a time-frequency position of the LRS received to obtain sequence information and/or time-frequency position information of the LRS, and obtaining the interference information of the node sending the LRS according to a mapping relationship between the interference information and the sequence and/or the time-frequency position.

Specifically, corresponding relationship of the LRS sequence and the interference information, corresponding relationship of the LRS time-frequency position and the interference information, or corresponding relationship of (the LRS sequence, the LRS time-frequency position) and the interference information is preset. Step S22 is illustrated below by taking a condition of presetting the corresponding relationship of the LRS sequence and the interference information as an example, and conditions of the other two corresponding relationships are similar, and will not be repeated redundantly herein. By performing LRS sequence detection on the received LRS, the LRS sequence of the received LRS may be obtained, and then, the interference information of the node sending the LRS to this node may be obtained according to the mapping relationship between the LRS sequence and the interference information. The interference information herein may express interference strength through different values of information bits, for example, the interference information is expressed by 1 bit, when the interference information is "0", it indicates weak interference, and when the interference information is "1", it indicates strong interference; or four grades of interference strength are expressed by two bits; or multiple bit combinations are adopted, each bit combination corresponds to a part of dedicated resources to express the interference conditions on the dedicated resources; and these are not limited in the embodiment. Specifically, the corresponding relationship of the LRS sequence and the interference information may be as shown in Table 3:

TABLE 3

| LRS sequence | Interference information |
|---|---|
| Sequence_0 | 00 |
| Sequence_1 | 01 |
| Sequence_2 | 10 |
| Sequence_3 | 11 |

In Table 3, when the interference information is "00", it indicates that interference of the node sending the LRS to the node receiving the LRS is strong, when the interference information is 01, it indicates that interference of the node sending the LRS to the node receiving the LRS is weak, when the interference information is "10", it indicates that interference to the node sending the LRS by the node receiving the LRS is strong, and when interference information is "11", it indicates that interference to the node sending the LRS by the node receiving the LRS is weak.

After the interference information is obtained in step S22, step S23 or step S24 may be executed.

Step S23, transmitting power or a resource configuration of this node is adjusted according to the interference information obtained in step S22.

The resource configuration includes at least one of an uplink and downlink sub frame ratio, an uplink and downlink carrier ratio, an uplink and downlink frequency band resource position, an uplink and downlink frequency band bandwidth and an available service resource type. The service resource type may be a large data file service, a short message service, a voice service, a time-frequency service or the like, and is mainly applied to an D2D communication between user equipments.

Specifically, when the interference information in step S22 indicates current interference is severe, interference coordination can be performed by improving transmitting power of data service of the node or adjusting the resource configuration, for example, when nodes receiving and sending the LRS are both cell base stations, the cell base stations receiving the LRS may select a frequency band different from that of an interference cell to avoid the interference of a neighboring cell, or select an uplink and downlink sub frame ratio (TDD system) or an uplink and downlink carrier ratio (FDD system) the same as the cell sending the LRS, in order to avoid the influence of the uplink and downlink interference of the neighboring cell on the performance.

Step S24, the interference information obtained in step S22 is reported to a centralized controller, and the centralized controller adjusts the transmitting power or the resource configuration of this node and/or the node sending the LRS according to the interference information.

Specifically, when the centralized controller receives the interference information reported by each node, it may uniformly coordinate the transmitting power or an used resource configuration of the each node through control signaling, so as to reduce the mutual interference between the nodes as much as possible.

Figure 9:
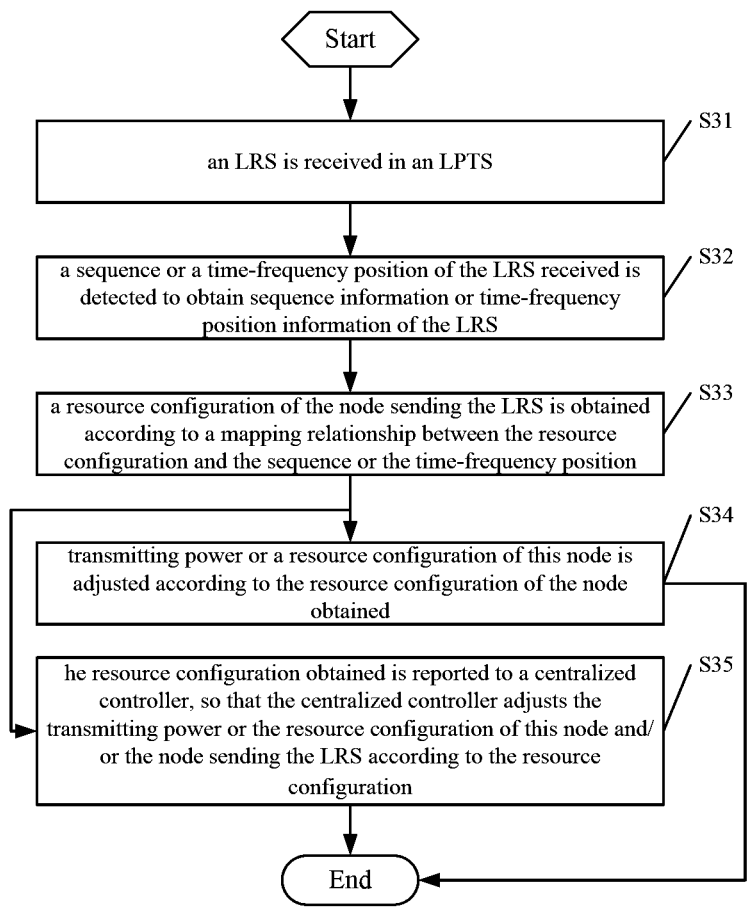
FIG. 9 is a schematic flowchart of a third embodiment of a listening method of the present invention.

Please refer to FIG. 9, it is a schematic flowchart of a third embodiment of a listening method of the present invention.

The method in FIG. 9 includes:

Step S31, an LRS is received in an LPTS.

The step is the same as the condition of receiving the LRS in step S11 in FIG. 1, and will not be repeated redundantly herein.

Step S32, a sequence or a time-frequency position of the LRS received in step S31 is detected to obtain sequence information or time-frequency position information of the LRS.

Specially, an LRS signal is received on all possible time-frequency positions and is associated with LRS signals corresponding to all possible local LRS sequences, when a related peak value is obtained on a certain LRS signal on a certain time-frequency position, the sequence information and/or the time-frequency position information of the LRS receiving the LRS signal is determined. According to the time-frequency position of the LRS, timing and a frequency of a node sending the LRS may also be directly obtained, so as to achieve time or frequency synchronization with the node sending the LRS, and the synchronization herein may specifically indicate initial synchronous obtaining or synchronous tracking.

Step S33, a resource configuration of the node sending the LRS is obtained according to a preset mapping relationship between the resource configuration and the sequence and/or the time-frequency position.

The resource configuration includes at least one of an uplink and downlink sub frame ratio, an uplink and downlink carrier ratio, an uplink and downlink frequency band resource position, an uplink and downlink frequency band bandwidth and an available service resource type. The service resource type may be a large data file service, a short message service, a voice service, a time-frequency servicde or the like, and is mainly applied to an D2D communication between user equipments.

The mapping relationship between the resource configuration and the LRS sequence and/or the time-frequency position may be preset in advance, for example, the one-to-one corresponding relationship of the uplink and downlink sub frame ratio in the resource configuration and the LRS sequence may be preset, the node sending the LRS currently uses which uplink and downlink sub frame ratio, and the LRS corresponding to the LRS sequence is correspondingly sent; for example, the corresponding relationship of an uplink sub frame ratio 0 and the LRS sequence_0 is set, and if the currently used uplink sub frame of the node sending the LRS is configured to 0, the LRS corresponding to the LRS sequence_0 will be sent.

After step S33, step S34 or step S35 may be selectively executed.

Step S34, transmitting power or a resource configuration of this node is adjusted according to the resource configuration of the node obtained in step S33.

It may be known from the resource configuration of the node sending the LRS obtained in step S33 that, when the resource configuration of the node sending the LRS will generate severe mutual interference with the resource configuration of this node, the transmitting power of this node may be reduced or the resource configuration of this node may be adjusted to avoid the interference to a neighboring node. For example, an uplink and downlink sub frame ratio of a node 2 obtained by a node 1 through step S33 is different from an uplink and downlink sub frame ratio of the node 1, and severe mutual uplink and downlink interference exists between them, the node 1 may change its own uplink and downlink sub frame ratio to be the same as that of the node 2 or adjust the uplink and downlink sub frame ratio to an uplink and downlink sub frame ratio generating no uplink and downlink interference to the node 2 according to its own service load condition.

Step S35, the resource configuration obtained in step S33 is reported to a centralized controller, so that the centralized controller adjusts the transmitting power or the resource configuration of this node and/or the node sending the LRS according to the resource configuration.

In step S35, after the resource configuration obtained in step S33 is reported to the centralized controller, the centralized controller may uniformly adjust the transmitting power or the resource configuration conditions of each node according to the resource configuration information reported by the each node, optionally, the centralized controller may only coordinate the transmitting power or the resource configuration of this node or the node sending the LRS, or the centralized controller may also simultaneously coordinate the transmitting power or the resource configuration of this node and the node sending the LRS, so as to reduce the interference between the nodes.

In the embodiment, detection on the sequence or the time-frequency position of the received LRS signal is performed to obtain the resource configuration of the node sending the LRS, and then, this node independently adjusts the interference with the node sending the LRS according to the obtained resource configuration, or the centralized controller uniformly adjusts the interference conditions of this node and/or the node sending the LRS according to the obtained resource configuration.

Figure 10:
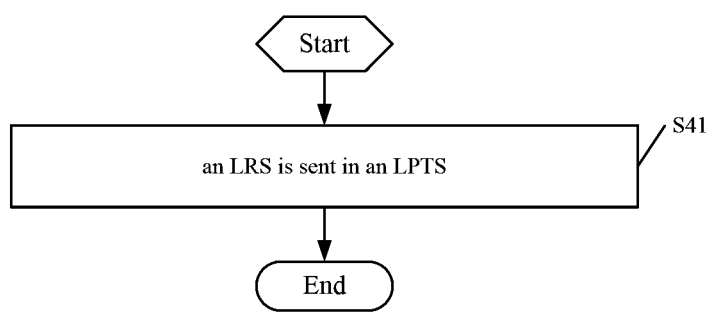
FIG. 10 is a schematic flowchart of a fourth embodiment of a listening method of the present invention.

Referring to FIG. 10, it is a schematic flowchart of a fourth embodiment of the listening method of the present invention.

The flow of the method in FIG. 10 illustrates the embodiment of the listening method of the present invention from the point of view of the sending side of an LRS. The flow of the method in FIG. 10 includes:

Step S41, an LRS is sent in an LPTS, wherein the LRS is used for transmitting interference information and/or a resource configuration to a node receiving the LRS.

Explanations of the LPTS and the LRS may refer to explanations in the first embodiment, and will not be repeated redundantly herein. The interference information in step S41 may include: interference of a node sending the LRS to the node receiving the LRS, or the interference to the node sending the LRS by the node receiving the LRS. The resource configuration in step S41 refers to a currently used resource configuration of the node sending the LRS, and the resource configuration includes at least one of an uplink and downlink sub frame ratio, an uplink and downlink carrier ratio, an uplink and downlink frequency band resource position, an uplink and downlink frequency band bandwidth and an available service resource type; the service resource type may be a large data file service, a short message service, a voice service, a time-frequency service or the like, and is mainly applied to an D2D communication between user equipments. In some implementations, step S41 may include: sending the LRS in the LPTS according to an indication of a configured sending listening pattern. The sending listening pattern defines some resource information when the node sends a listening signal, for example, the sending listening pattern defines when the node needs to send the LRS and sends what kind of the LRS. It should be noted that the sending listening patterns used by each node should be "orthorhombic" (namely, different). In some implementations, the sending listening pattern includes an LRS sequence and time-frequency position information of the LRS, wherein the LRS sequence may be a sequence used in LTE SRS (Sounding Reference Signal, souding reference signal) or PRACH (Physical Random Access Channel, physical random access channel), for reducing design complexity. Of course, the LRS sequence may be redesigned, and in the embodiment, all these conditions are not limited. It should be noted that the LRS sequences should be mutually "orthorhombic", in order to ensure that corresponding LRS signals thereof are also mutually "orthorhombic". The information about time-frequency position of the LRS defines information about the time and frequency in which the node needs to send the LRS, and the node needs to send the LRS in a listening pilot time slot corresponding to the information about time-frequency position of the LRS. Therefore, the sending the LRS in the LPTS according to an indication of the configured sending listening pattern further includes: sending the LRS corresponding to the LRS sequence in the LPTS corresponding to the information about time-frequency position of the LRS.

The receiving node may further directly obtain timing and a frequency of the node sending the LRS by detecting a sending time and a frequency position of the LRS, and thus, the node sending the LRS may also provide time synchronization or frequency synchronization for the node receiving the LRS, and the synchronization herein may specifically indicate initial synchronous obtaining or synchronous tracking. The timing may also be considered as the resource configuration of the node sending the LRS.

In some implementations, step S41 includes: transmitting the LRS in the LPTS in corresponding transmitting power according to a mapping relationship between the interference information and the transmitting power. The implementation may be combined with the foregoing manner of sending the LRS in the LPTS according to the indication of the sending listening pattern, in order to transmit the interference information. Specifically, it may be set that transmitting power of a service channel of a node is in direct proportion to the transmitting power of the LRS, the transmitting power of the service channel of the node may express the interference condition of the node, for example, high transmitting power of the service channel of the node may express strong interference of the node to other nodes, and thus when the interference of the node is strong, the LRS may be transmitted at a high transmitting power correspondingly.

In some implementations, step S41 includes: sending the LRS corresponding to a sequence corresponding to the interference information in the LPTS and/or sending the LRS in the LPTS corresponding to the time-frequency position corresponding to the interference information according to a mapping relationship between the interference information and the LRS sequence and/or a mapping relationship between the interference information and the time-frequency position of the LRS. For example, it is pre-defined that "1" expresses strong interference and "0" expresses weak interference, corresponding relationship of "1" and LRS sequence_0 and corresponding relationship of "0" and LRS sequence 1 are established, and if the current interference information of the node is "1", the LRS corresponding to the LRS sequence_0 is sent in the LPTS.

In some implementations, step S41 includes: sending the LRS corresponding to a sequence corresponding to the resource configuration in the LPTS and/or sending the LRS in the LPTS corresponding to the time-frequency position corresponding to the resource configuration according to a mapping relationship between the resource configuration and the LRS sequence and/or a mapping relationship between the resource configuration and the time-frequency position of the LRS. The implementation is illustrated by taking the uplink and downlink sub frame ratio in the resource configuration as an example: corresponding relationship of uplink and downlink sub frame ratio "6" and the LRS sequence_0 is preset, and if the currently used uplink and downlink sub frame ratio of the node is "6", the LRS corresponding to the LRS sequence_0 is sent in the LPTS.

In the embodiment, by means of the above-mentioned implementations, the interference information and/or the resource configuration is transmitted to the node receiving the LRS, so that the node receiving the LRS obtains the interference information and/or the resource configuration by analyzing the received LRS and implement corresponding interference coordination.

The foregoing description illustrates the embodiment of the listening method of the present invention, and an illustration is made below to the embodiment of the node executing the method corresponding to the flow of the above-mentioned method.

Figure 11:
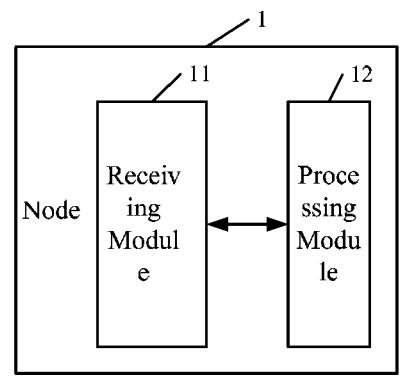
FIG. 11 is a schematic diagram of a structure of an embodiment of a node receiving LRS of the present invention.

Referring to FIG. 11, it is a schematic diagram of a structure of an embodiment of a node of the present invention.

In FIG. 11, a node 1 may be an eNB (evolved Node B, evolved Node B) or a UE, since a node 10 may be an eNB or a UE, mutually listening between the eNBs, between the UEs or between an eNB and a UE may be achieved. The node 1 includes:

a receiving module 11, configured to receive an LRS (Listening Reference Signal, listening reference signal) in an LPTS (Listening Pilot Time Slot, listening pilot time slot);

a processing module 12, configured to analyze the LRS received to obtain the interference information and/or a resource configuration of a node sending the LRS.

The LPTS is illustrated firstly.

Referring to FIG. 2, it is a schematic diagram of a structure of a radio frame in an existing LTE TDD (Long Term Evolution Time Division Duplexing, long term evolution time division duplexing) system. As shown in FIG. 2, duration of one radio frame (One radio frame) is 10 ms, the radio frame includes two half frames (One half frame) with duration of 5 ms, one half frame includes 5 sub frames, and duration of each sub frame is 1 ms. Taking the first half frame as an example, it includes a sub frame 0 (#0), a sub frame 1 (#1), a sub frame 2 (#2), a sub frame 3 (#3) and a sub frame 4 (#4); in the first half frame, the sub frame 1 is called a "special sub frame" by those skilled in the art, for the sub frame 1 includes: a DwPTS (Downlink Pilot Time Slot, downlink pilot time slot), a GP (Guard Period, guard period) and a UpPTS (Uplink Pilot Time Slot, uplink pilot time slot). It should be noted that, under a condition of some defined uplink and downlink sub frame ratios (ratios 0, 1, 2, 6), the "special sub frame", namely, a sub frame 6, also exists in the second half frame, and which also includes: the DwPTS, the GP and the UpPTS. A guard period (GP) may be used for implementing uplink and downlink switch, for avoiding uplink and downlink interference resulting from propagation time delay between adjacent cells.

In the embodiment, the LPTS is located in the GP in FIG. 2, and the LPTS is provided with guard periods with the DwPTS and the UpPTS. It should be noted that the LPTS may be located in the GP of a first and/or a second "special sub frame" in FIG. 2.

Referring to FIG. 3, it is a schematic diagram of a structure of an embodiment of a special sub frame in the LTE TDD system of the present invention. As shown in FIG. 3, the LPTS is located in the GP and may occupy one or multiple symbols (in a frame structure, a symbol is a minimal time unit). The LPTS is provided with guard periods GP1 and GP2 with the DwPTS and the UpPTS respectively. It should be noted that, the lengths of the GP, the LPTS, the GP1 and the GP2 may be pre-configured to make them meet a listening requirement. In the LTE TDD system, it will not generate any effects on a node not supporting the listening method of the embodiment that the LPTS is arranged in the GP of the special sub frame, thereby having good backward compatibility.

Further, the LPTS may also be divided into at least two listening windows, guard periods are arranged between the listening windows, a function of each listening window equals to a listening time slot, and the node may send or receive a listening reference signal in each listening window. For example, as shown in FIG. 4, it is a schematic diagram of a structure of an embodiment of a special sub frame including two listening windows.

Referring to FIG. 5, it is a schematic diagram of a structure of an uplink frequency band or a downlink frequency band in an existing LTE FDD (Long Term Evolution Frequency Division Duplexing, long term evolution frequency division duplexing) system. In the LTE TDD system, uplink and downlink data are transmitted in different frequency bands, the LTE FDD system adopts paired frequency bands to transmit data, and the adopted frequency bands are called uplink frequency bands or downlink frequency bands. As shown in FIG. 5, the length of the uplink frequency band or the downlink frequency band is 10 ms, it includes 10 sub frames (Sub frame) with length of 1 ms, each sub frame includes two time slots, and the length of each time slot is 0.5 ms. For example, in FIG. 5, a time slot 0 (#0) and a time slot (#1) form the $0^{th}$ sub frame. In FIG. 5, each sub frame may be used for transmitting a data signal or a control signal.

In the embodiment, the LPTS is located in a dedicated sub frame of the uplink frequency band or in a dedicated sub frame of the downlink frequency band, and a guard period is arranged between the LPTS and a time slot occupied by a data signal of the dedicated sub frame, or a guard period is arranged between the LPTS and a time slot occupied by a control signal of the dedicated sub frame. In this case, the dedicated sub frame may be any sub frame in FIG. 5, and preferably, the dedicated sub frame is the first sub frame in FIG. 5, namely, a sub frame composed of a time slot 2 (#2) and a time slot 3 (#3). An advantage of taking the first sub frame as the dedicated sub frame for setting LPTS lies in that: positions of the LPTS in the LTE TDD system and the LTE FDD system may be identical, and thus design complexity of a system is reduced. Specifically, please refer to FIG. 6, it is a schematic diagram of a structure of an embodiment of a dedicated sub frame in an LTE FDD system of the present invention. It may be understood that, in the LTE FDD system, the LPTS may further include a plurality of listening windows, a meaning and a function of the listening windows are similar to those in the LTE TDD system, and will not be repeated redundantly herein.

In the embodiment, in an LTE system, the LPTS may also be located in an MBFSN sub frame configured as an MBFSN (Broadcast Multicast) sub frame, and a guard period is arranged between the LPTS and a time slot occupied by a data signal of the MBSFN sub frame or a guard period is arranged between the LPTS and a time slot occupied by a control signal of the MBFSN sub frame. The MBFSN sub frame includes a PDCCH (physical downlink control channel, physical downlink control channel) for a unicast and a broadcast multicast data channel Since when there is no a broadcast multicast service, a UE in a cell will not receive downlink data on the sub frame; therefore, a part of resources of the data channel may be used for sending and receiving LRS between the base stations or between the UEs. Specifically, as shown in FIG. 7, the LPTS is located behind the PDCCH of the MBFSN sub frame and is provided with guard periods GP1 and GP2 with the PDCCH or other channels or signals not for listening, respectively. Similarly, the LPTS may further include at least two listening windows, different nodes send or receive listening reference signals on different listening windows, and the guard periods are arranged between multiple listening windows.

In the embodiment, under a multicarrier communication condition, the LPTS may also be only located in one or more pre-set carriers in all available carriers of the system. In the pre-set carriers containing LPTS, the LPTS may be located in the foregoing special sub frame, the dedicated sub frame or the MBFSN sub frame. Further, if the pre-set carriers are merely used for transmitting the listening signal, a time-frequency resource on the pre-set carriers may be divided into one or more LPTSs, and the guard periods are arranged between different LPTSs.

The LPTS is illustrated above, and a further illustration is made below to the receiving module 11 configured to send or receive the LRS in the LPTS.

In additional, the receiving module 11 is configured to receive the LRS in the LPTS according to an indication of a configured listening pattern.

The listening pattern includes: a receiving listening pattern. The listening patterns used by the node 1 may be uniformly configured by the system in advance, that is to say, the system may allocate the listening patterns to each node in advance. Or, the configured listening pattern used by the node 1 may also be obtained actively by the node according to its own node sequency number, wherein a relationship of a node sequency number and a listening pattern is pre-configured, for example, the corresponding relationship of a node sequency number 0 and a listening pattern 0 is configured in advance, and then the node with node sequence number of 0 will automatically obtain the listening pattern 0 to be used.

In the above-mentioned description, the receiving listening pattern defines some resource information when the node receives a listening signal, for example, when the receiving listening pattern needs to receive the LRS and receives what kind of the LRS, etc., It should be noted that, the node 1 may directly receive the LRSs of other nodes in these LPTSs not needing to send the LRS, instead of according to the indication of the receiving listening pattern, and when receiving the LRSs, the node 1 does not need to perform signal search, in order to reduce consumption of listening time and the power. In the embodiment, the receiving listening pattern is allocated to the node 1, so that the node 1 listens to some dedicated LRS signals at a dedicated time. In some implementations, the receiving listening pattern includes an LRS sequence and time-frequency position information of the LRS, wherein the LRS sequence corresponds to LRS which the node needs to receive, and the time-frequency position information of the LRS corresponds to time-frequency information of the LRS which the node needs to receive. Therefore, the receiving module are further configured to receive the LRS corresponding to the LRS sequence in the LPTS corresponding to the time-frequency position information of the LRS.

An illustration to the above-mentioned process is described below merely schematically.

It is assumed that in the LTE TDD system, the LPTS is located in the sub frame 1 of each radio frame, and there are four mutually orthorhombic LRS sequences {sequence_0, sequence_1, sequence_2, sequence_3}, for defining four listening patterns as shown in Table 4.

TABLE 4

| Listening pattern sequence number | LRS sequence | Time-frequency position information |
|---|---|---|
| 0 | Sequence_0 | arg[Mod ($N_{frame}$, 4)]∈{0, 1, 2} |
| 1 | Sequence_1 | arg[Mod ($N_{frame}$, 4)]∈{1, 2, 3} |
| 2 | Sequence_2 | arg[Mod ($N_{frame}$, 4)]∈{0, 2, 3} |
| 3 | Sequence_3 | arg[Mod ($N_{frame}$, 4)]∈{0, 1, 3} |

In Table 4, $N_{frame}$ expresses a sequence number of a radio frame, and arg[Mod ($N_{frame}$, x)]=y expresses a radio frame meeting the condition that the sequence number modulo x is equal to y. In this way, for a radio frame 0, a radio frame 1, a radio frame 2 and a radio frame 3, $N_{frame}$ in the time-frequency position information arg[Mod (Nframe, 4)]∈{0,1, 2} of the listening pattern 0 is equal to 0,1,2, and that of the other listening patterns are similar. That is to say, the node which is allocated the listening pattern 0 will send an LRS corresponding to the sequence_0 in the LPTSs of the radio frame 0, the radio frame 1 and the radio frame 2.

The above-mentioned listening patterns 0-3 are allocated to eNB1, eNB2, UE1 and UE2 respectively, and then the node will send the LRS on the allocated listening pattern and receive the LRS sent by other nodes on other listening patterns. After passing the radio frame 0, the radio frame 1, the radio frame 2 and the radio frame 3, the statistics on sending or receiving LRS between the nodes is shown in Table 5.

TABLE 5

| | Radio frame 0 | Radio frame 1 | Radio frame 2 | Radio frame 3 |
|---|---|---|---|---|
| eNB1 | Sending LRS | Sending LRS | Sending LRS | Receiving LRS |
| eNB2 | Receiving LRS | Sending LRS | Sending LRS | Sending LRS |
| UE1 | Sending LRS | Receiving LRS | Sending LRS | Sending LRS |
| UE2 | Sending LRS | Sending LRS | Receiving LRS | Sending LRS |

It can be seen from Table 5, within the duration of the four radio frames, mutually listening between every two of the eNB1, the eNB2, the UE1 and the UE2 is achieved.

The condition that the node 1 sends or receives the LRS in the LPTS is illustrated above, and it is further illustrated below that the node 1 analyzes the LRS received to obtain the interference information of the node sending the LRS to the node 1 or the resource configuration of the node sending the LRS.

Specifically, the processing module 12 mainly analyzes the received LRS in three manners: one is to detect the received signal power of the LRS to obtain the interference information of the node sending the LRS to this node, the interference information may be signal interference strength information, and the interference information may include: the interference of the node sending the listening reference signal to the node (namely, the node 1) receiving the reference signal, or the interference to the node sending the listening reference signal by the node receiving a reference signal; another one is to detect a sequence and/or a time-frequency position of the received LRS and obtain the interference information of the node sending the LRS according to a preset mapping relationship between the interference information and the sequence and/or time-frequency position; still another one is to detect a sequence and/or a time-frequency position of the received LRS and obtain the resource configuration of the node sending the LRS according to a preset mapping relationship between the resource configuration and the sequence and/or time-frequency position, wherein the resource configuration includes at least one of an uplink and downlink sub frame ratio, an uplink and downlink carrier wave ratio, an uplink and downlink frequency band resource position, an uplink and downlink frequency band bandwidth and an available service resource type; the service resource type may be a large data file service, a short message service, a voice service, a time-frequency service or the like, and is mainly applied to an D2D communication between user equipments.

By the above-mentioned three analysis manners of the processing module 12, the node 1 may understand the interference information of the node sending the LRS to the node 1 or the interference information to the node sending the LRS by the node 1 or the resource configuration of the node sending the LRS; further, the node 1 may coordinate interference of the node 1 and the node sending the LRS based on the above-mentioned information, in order to reduce the interference between the nodes.

It should be noted that the embodiment may be applied to an D2D communication. For example, if the UE1 and the UE2 have established an D2D connection, the UE1 may know the condition of a connection with the UE2 through the embodiment, and may select to actively release the connection with the UE2 in the case of severe interference; if the UE1 and the UE2 do not establish the D2D connection, the UE1 may listen to the resource configuration of other UE by using the embodiment, so as to find the UE2 and establish the D2D connection with the UE2.

The node 1 in the embodiment of the present invention receives the listening reference signal in the listening pilot time slot, and analyzes the received listening reference signal to obtain the interference information and/or the resource configuration of the node sending the listening reference signal, so as to listen to interference condition and/or resource configuration of an adjacent node.

Continue to refer to FIG. 11, it is an illustration of another embodiment of a node 1 of the present invention.

In the embodiment, 1 the receiving module 11 is still configured to receive LRS in LPTS, which is the same as the above-mentioned embodiment, and will not be repeated redundantly herein.

The processing module 12 is configured to perform a received signal power detection for the LRS received to obtain interference information of a node sending the LRS.

Specifically, it may be set in advance that transmitting power of the LRS is in direct proportion to transmitting power of a service channel of the node, the transmitting power of the service channel may express the interference information. Generally, the higher the transmitting power of the service channel is, the more severe the interference is, and thus, it may be understood herein that a mapping relationship (direct proportion relationship) between the transmitting power of the LRS and the interference information is preset. When the processing module 12 detects the received signal power of the received LRS to obtain the transmitting power of the listening reference signal, current transmitting power of the service channel of the node sending the LRS may be obtained according to the above-mentioned direct proportion relationship, so as to obtain the interference information of the node sending the LRS to this node, and the interference information herein mainly indicates signal interference strength information. For example, if the processing module 12 detects the received signal power of the received LRS and finds that the power of the received LRS is high, it will be indicated that the current transmitting power of the service channel of the node sending the LRS is high, that is to say, the signal interference strength of the node sending the LRS to the this node is strong currently; on the contrary, the signal interference strength of the node sending the LRS to this node is weak currently.

Optionally, the processing module 12 may also be: configured to detect a sequence and/or a time-frequency position of the LRS received to obtain sequence information and/or time-frequency position information of the LRS, and obtain interference information of a node sending the LRS according to a mapping relationship between the interference information and the sequence and/or the time-frequency position.

Specifically, corresponding relationship of the LRS sequence and the interference information, corresponding relationship of the LRS time-frequency position and the interference information, or corresponding relationship of (the LRS sequence, the LRS time-frequency position) and the interference information is preset. Above-mentioned process is illustrated below by taking a condition of presetting the corresponding relationship of the LRS sequence and the interference information as an example, and conditions of the other two corresponding relationships are similar, and will not be repeated redundantly herein. By performing LRS sequence detection on the received LRS, the processing module 12 may obtain the LRS sequence of the received LRS, and then, the interference information of the node sending the LRS to this node may be obtained according to the mapping relationship between the LRS sequence and the interference information. The interference information herein may express interference strength through different values of information bits, for example, the interference information is expressed by 1 bit, when the interference information is "0", it indicates weak interference, and when the interference information is "1", it indicates strong interference; or four grades of interference strength are expressed by two bits; or multiple bit combinations are adopted, each bit combination corresponds to a part of dedicated resources to express the interference conditions on the dedicated resources; and these are not limited in the embodiment.

After obtaining the interference information, the processing module 12 may adjust transmitting powder or a resource configuration of this node according to the obtained interference information.

The resource configuration includes at least one of an uplink and downlink sub frame ratio, an uplink and downlink carrier ratio, an uplink and downlink frequency band resource position, an uplink and downlink frequency band bandwidth and an available service resource type. The service resource type may be a large data file service, a short message service, a voice service, a time-frequency service or the like, and is mainly applied to an D2D communication between user equipments.

Specifically, when the interference information indicates current interference is severe, then the processing module 12 may improve transmitting power of data service of the node 1 or adjust the resource configuration to implement interference coordination, for example, when nodes receiving and sending the LRS are both cell base stations, the cell base stations receiving the LRS may select a frequency band different from that of an interference cell to avoid the interference of a neighboring cell, or select an uplink and downlink sub frame ratio (TDD system) or an uplink and downlink carrier ratio (FDD system) the same as the cell sending the LRS, in order to avoid the influence of the uplink and downlink interference of the neighboring cell on the performance.

Or, after obtaining the interference information, the processing module 12 reports the interference information to a centralized controller, and the centralized controller adjusts the transmitting power or the resource configuration of this node and/or the node sending the LRS according to the interference information.

Specifically, when the centralized controller receives the interference information reported by each node, it may uniformly coordinate the transmitting power or an used resource configuration of the each node through control signaling, so as to reduce the mutual interference between the nodes as much as possible.

Continue to refer to FIG. 11, it is an illustration to another embodiment of a node of the present invention.

In the embodiment, the receiving module 11 is still configured to receive an LRS in an LPTS, which is the same as the above-mentioned embodiment, and will not be repeated redundantly herein.

The processing module 12 is configured to detect a sequence or a time-frequency position of the received LRS to obtain sequence information or time-frequency position information of the LRS.

Specially, the receiving module 11 receives an LRS signal on all possible time-frequency positions, the processing module 12 associates the received LRS with LRS signals corresponding to all possible local LRS sequences, and when a related peak value is obtained on a certain LRS signal on a certain time-frequency position, the sequence information and/or the time-frequency position information of the LRS receiving the LRS signal is determined.

The processing module 12 is further configured to obtain the resource configuration of the node sending the LRS according to a preset mapping relationship between the resource configuration and the sequence and/or the time-frequency position.

The resource configuration includes at least one of an uplink and downlink sub frame ratio, an uplink and downlink carrier ratio, an uplink and downlink frequency band resource position, an uplink and downlink frequency band bandwidth and an available service resource type. The service resource type may be a large data file service, a short message service, a voice service, a time-frequency servicde or the like, and is mainly applied to an D2D communication between user equipments.

The mapping relationship between the resource configuration and the LRS sequence and/or time-frequency position may be preset in advance, for example, the one-to-one corresponding relationship of the uplink and downlink sub frame ratio in the resource configuration and the LRS sequence may be preset, the node sending the LRS currently uses which uplink and downlink sub frame ratio, and the LRS corresponding to the LRS sequence is correspondingly sent; in addition, according to the time-frequency position of the LRS, timing and a frequency of the node sending the LRS may also be directly obtained, so as to achieve time or frequency synchronization with the node sending the LRS, and the synchronization herein may specifically indicate initial synchronous obtaining or synchronous tracking.

After obtaining the resource configuration of the node sending the LRS, the processing module 12 is further configured to adjust transmitting power or a resource configuration of the node 1 according to the obtained resource configuration.

When the processing module 12 finds that the resource configuration of the node sending the LRS will generate severe mutual interference with the resource configuration of the node 1, the processing module 12 may reduce the transmitting power of the node 1 or adjust the resource configuration of the node 1 to avoid interference to a neighboring node. For example, an uplink and downlink sub frame ratio of a node 2 obtained by the node 1 is different from an uplink and downlink sub frame ratio of the node 1, and severe mutual uplink and downlink interference exists between them, the node 1 may change its own uplink and downlink sub frame ratio to be the same as that of the node 2 or regulate the uplink and downlink sub frame ratio to an uplink and downlink sub frame ratio generating no uplink and downlink interference to the node 2 according to its own service load condition.

After obtaining the resource configuration of the node sending the LRS, the processing module 12 may be further selectively configured to report the obtained resource configuration to a centralized controller, so that the centralized controller adjusts the transmitting power or the resource configuration of the node 1 and/or the node sending the LRS according to the resource configuration.

After the processing module 12 reports the obtained source allocation to the centralized controller, the centralized controller may uniformly adjust the transmitting power or the resource configuration conditions of each node according to the resource configuration information reported by the each node, optionally, the centralized controller may only coordinate the transmitting power or the resource configuration of this node or the node sending the LRS, or the centralized controller may also simultaneously coordinate the transmitting power or the resource configuration of this node and the node sending the LRS, so as to reduce the interference between the nodes.

In the embodiment, detection on the sequence or the time-frequency position of the received LRS signal is performed to obtain the resource configuration of the node sending the LRS, and then, this node independently adjusts the interference with the node sending the LRS according to the obtained resource configuration, or the centralized controller uniformly adjusts the interference conditions of this node and/or the node sending the LRS according to the obtained resource configuration.

Figure 12:
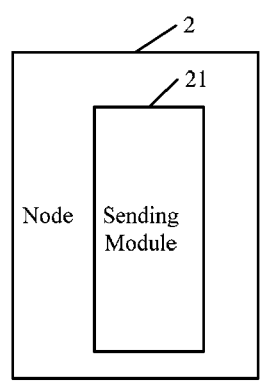
FIG. 12 is a schematic diagram of a structure of an embodiment of a node sending LRS of the present invention.

Referring to FIG. 12, it is a schematic diagram of a structure of an embodiment of a node sending LRS of the present invention.

The node 2 includes: a sending module 21, configured to send an LRS in an LPTS, wherein the LRS is used for transmitting interference information and/or a resource configuration to a node (the node 1 in FIG. 11) receiving the LRS.

Explanations of the LPTS and the LRS may refer to the explanations in the embodiment as shown in FIG. 11, and will not be repeated redundantly herein. The above-mentioned interference information may include: interference of a node sending the LRS to the node receiving the LRS, or the interference to the node sending the LRS by the node receiving the LRS. The above-mentioned resource configuration refers to a currently used resource configuration of the node sending the LRS, and the resource configuration includes at least one of an uplink and downlink sub frame ratio, an uplink and downlink carrier ratio, an uplink and downlink frequency band resource position, an uplink and downlink frequency band bandwidth and an available service resource type; the service resource type may be a large data file service, a short message service, a voice service, a time-frequency service or the like, and is mainly applied to an D2D communication between user equipments; in addition, according to the time-frequency position of the LRS, timing and a frequency of the node sending the LRS may also be directly obtained, so as to achieve time or frequency synchronization with the node sending the LRS, and the synchronization herein may specifically indicate initial synchronous obtaining or synchronous tracking, and the timing may also be seen as a resource configuration.

In some implementations, the sending module 21 is configured to send the LRS in the LPTS according to an indication of a configured sending listening pattern. The sending listening pattern defines some resource information when the node sends a listening signal, for example, the sending listening pattern defines when the node needs to send LRS and sends what kind of LRS. It should be noted that the sending listening patterns used by each node should be "orthorhombic" (namely, different). In some implementations, the sending listening pattern includes an LRS sequence and time-frequency position information of the LRS, wherein the LRS sequence may be a sequence used in LTE SRS (Sounding Reference Signal, souding reference signal) or PRACH (Physical Random Access Channel, physical random access channel), for reducing design complexity. Of course, the LRS sequence may be redesigned, and in the embodiment, all these conditions are not limited. It should be noted that the LRS sequences should be mutually "orthorhombic", in order to ensure that corresponding LRS signals thereof are also mutually "orthorhombic". The information about time-frequency position of the LRS defines information about the time and frequency in which the node needs to send the LRS, and the node needs to send the LRS in a listening pilot time slot corresponding to the information about time-frequency position of the LRS. Therefore, the sending the LRS in the LPTS according to an indication of the configured sending listening pattern further includes: sending the LRS corresponding to the LRS sequence in the LPTS corresponding to the information about time-frequency position of the LRS.

In some implementations, the sending module 21 is configured to transmit the LRS in the LPTS in corresponding transmitting power according to a mapping relationship between the interference information and the transmitting power. The implementation may be combined with the foregoing manner of sending the LRS in the LPTS according to the indication of the sending listening pattern, in order to transmit the interference information. Specifically, it may be set that transmitting power of a service channel of a node is in direct proportion to the transmitting power of the LRS, the transmitting power of the service channel of the node may express the interference condition of the node, for example, high transmitting power of the service channel of the node may express strong interference of the node to other nodes, and thus when the interference of the node is strong, the LRS may be transmitted at a high transmitting power correspondingly.

In some implementations, the sending module 21 is configured to send the LRS corresponding to a sequence corresponding to the interference information in the LPTS and/or sending the LRS in the LPTS corresponding to the time-frequency position corresponding to the interference information according to a mapping relationship between the interference information and the LRS sequence and/or a mapping relationship between the interference information and the time-frequency position of the LRS. For example, it is pre-defined that "1" expresses strong interference and "0" expresses weak interference, corresponding relationship of "1" and LRS sequence_0 and corresponding relationship of "0" and LRS sequence_1 are established, and if the current interference information of the node is "1", the LRS corresponding to the LRS sequence_0 is sent in the LPTS.

In some implementations, the sending module 21 is configured to send the LRS corresponding to a sequence corresponding to the resource configuration in the LPTS and/or sending the LRS in the LPTS corresponding to the time-frequency position corresponding to the resource configuration according to a mapping relationship between the resource configuration and the LRS sequence and/or a mapping relationship between the resource configuration and the time-frequency position of the LRS. The implementation is illustrated by taking the uplink and downlink sub frame ratio in the resource configuration as an example: corresponding relationship of uplink and downlink sub frame ratio "6" and the LRS sequence_0 is preset, and if the currently used uplink and downlink sub frame ratio of the node is "6", the LRS corresponding to the LRS sequence_0 is sent in the LPTS.

In the embodiment, by means of the above-mentioned implementation, the interference information and/or the resource configuration is transmitted to the node receiving the LRS, so that the node receiving the LRS obtains the interference information and/or the resource configuration by analyzing the received LRS and implement corresponding interference coordination.

It should be appreciated for those of ordinary skill in the art that all or a part of the procedures in the above-mentioned embodiments of a method may be implemented with a computer program instructing corresponding hardware. The above-mentioned program may be stored in a computer readable storage medium. The procedures of the embodiments of the respective methods mentioned above may be included when the program is executed; and the above-mentioned storage medium includes a magnetic disk, an optical disk, a read-only memory (Read-Only Memory, ROM), a random access memory (Random Access Memory, RAM) or the like.

The preceding embodiments are only used to illustrate the technical solutions of the present invention rather than limiting the present invention; it should be appreciated for those of ordinary skill in the art that all or a part of the procedures in the above-mentioned embodiments, and the equivalent variations made according to the claims of the present invention are still encompassed in the scope of the present invention.

What is claimed is:

1. A method for communication between nodes of a wireless network, comprising:
   receiving, by a first network node, a listening reference signal in a listening pilot time slot from a second network node, wherein receiving the listening reference signal in the listening pilot time slot is based on an indication of a configured receiving listening pattern, the configured receiving listening pattern comprising a sequence of the listening reference signal and time-frequency position information of the listening reference signal; and
   analyzing, by the first network node, the received listening reference signal to obtain interference information corresponding to the second network node and/or a resource configuration corresponding to the second network node.

2. The method according to claim 1, wherein the wireless network utilizes Long Term Evolution Time Division Duplexing (LTE TDD), and wherein the listening pilot time slot is located in a first guard period of a special sub frame, a second guard period is arranged between the listening pilot time slot and an uplink pilot signal time slot of the special sub frame, and a third guard period is arranged between the listening pilot time slot and a downlink pilot signal time slot of the special sub frame.

3. The method according to claim 1, wherein analyzing the received listening reference signal comprises:
performing a received signal power detection of the received listening reference signal to obtain the interference information of the second network node.

4. The method according to claim 3, further comprising:
adjusting transmitting power or a resource configuration based on the interference information corresponding to the second network node.

5. The method according to claim 1, wherein the analyzing comprises:
detecting a sequence and/or a time-frequency position of the listening reference signal to obtain sequence information and/or time-frequency position information of the listening reference signal; and
obtaining the resource configuration of the second network node according to a mapping relationship between the sequence of the listening reference signal and the resource configuration and/or a mapping relationship between the time-frequency position of the listening reference signal and the resource configuration.

6. The method according to claim 5, further comprising:
adjusting transmitting power or a resource configuration according to the resource configuration corresponding to the second network node.

7. The method according to claim 1, wherein the interference information comprises: interference on the first network node caused by the second network node, or interference on the second network node caused by the first network node.

8. A first network node, comprising:
a receiver, configured to receive a listening reference signal in a listening pilot time slot according to an indication of a configured receiving listening pattern from a second network node, wherein the configured receiving listening pattern comprises: a sequence of the listening reference signal and time-frequency position information of the listening reference signal;
a processor, configured to analyze the received listening reference signal to obtain interference information corresponding to the second network node and/or a resource configuration corresponding to the second network node.

9. The first network node according to claim 8, wherein the first network node is part of a Long Term Evolution Time Division Duplexing (LTE TDD) system, and wherein the listening pilot time slot is located in a first guard period of a special sub frame, a second guard period is arranged between the listening pilot time slot and an uplink pilot signal time slot of the special sub frame, and a third guard period is arranged between the listening pilot time slot and a downlink pilot signal time slot of the special sub frame.

10. The first network node of according to claim 8, wherein the processor is configured to perform a received signal power detection of the received listening reference signal to obtain the interference information of the second network node.

11. The first network node according to claim 10, wherein the processor is further configured to adjust transmitting power or a resource configuration of the first network node according to the interference information.

12. The first network node of according to claim 8, wherein:
the processor is configured to detect a sequence and/or a time-frequency position of the listening reference signal to obtain sequence information and/or time-frequency position information of the listening reference signal; and
the processor is configured to obtain the resource configuration of the second network node according to a mapping relationship between the sequence of the listening reference signal and the resource configuration and/or a mapping relationship between the time-frequency position of the listening reference signal and the resource configuration.

13. The first network node according to claim 12, wherein the processor is further configured to adjust transmitting power or a resource configuration of the first network node according to the resource configuration of the second network node.

14. The first network node according to claim 8, wherein the interference information comprises: interference on the first network node caused by the second network node, or interference on the second network node caused by the first network node.

15. The method according to claim 5, further comprising:
performing time synchronization or frequency synchronization with the second network node according to the resource configuration of the second network node.

16. The first node according to claim 12, wherein the processor is further configured to perform time synchronization or frequency synchronization with the second network node according to the resource configuration of the second network node.

* * * * *